US005144176A

United States Patent [19]

Popper

[11] Patent Number: 5,144,176

[45] Date of Patent: Sep. 1, 1992

[54] THREE-MASS ELECTROMAGNETIC VIBRATING SYSTEM

[75] Inventor: Boaz Popper, Haifa, Israel

[73] Assignee: Ricor Ltd., Cryogenic & Vacuum Systems, En-Harod, Israel

[21] Appl. No.: 508,732

[22] Filed: Apr. 16, 1990

[30] Foreign Application Priority Data

Apr. 17, 1989 [IL] Israel ........................................ 89983

[51] Int. Cl.[5] ........................ H02K 7/065; B65G 27/24

[52] U.S. Cl. .......................................... 310/81; 73/668

[58] Field of Search ........................ 310/15, 22, 36, 51, 310/81; 318/114; 73/662, 666, 668

[56] References Cited

U.S. PATENT DOCUMENTS 3,312,841 10/1963 Makino ................................ 310/81

4,909,379 3/1990 Albeck et al. .

FOREIGN PATENT DOCUMENTS 636039 12/1978 U.S.S.R. ................................ 310/81

716625 2/1980 U.S.S.R. ................................ 73/668

796688 1/1981 U.S.S.R. ................................ 73/666

*Primary Examiner*—Steven L. Stephan

*Assistant Examiner*—D. L. Rebsch

*Attorney, Agent, or Firm*—Fleit, Jacobson, Cohn, Price, Holman & Stern

[57] ABSTRACT

An electromagnetic vibrating motor requires certain criteria to perform its functions. Such criteria include: achieving high amplitudes from the driven motor when compared with the relatively restricted active gap of a simple electromagnet, the amplitude of the driven member should be unaffected by weight variations or changes in resiliently constraining forces, it should have a stationary member for suspending the system without imparting substantial vibrations to the vicinity, and it should be easily connected to driven member of the system. The present invention includes three masses. The first mass is a driven mass, the second mass is an electromagnetic member and the third mass is a magnetic member. These masses are connected together through springs in order to perform its necessary functions while meeting the required criteria.

7 Claims, 2 Drawing Sheets

THREE-MASS ELECTROMAGNETIC VIBRATING SYSTEM

BACKGROUND AND REQUIREMENTS

Many electromagnetic vibrating motors are known. Often stringent special requirements have to be met by these motors, which can be fulfilled only by the novel device to be described hereunder. Such a device should meet the following criteria:

A. Should be high when compared with the relatively restricted active gap of a simple electromagnet.
B. Driven member amplitudes should be uneffected by weight variations of that member and/or changes in resiliently constraining forces on that member.
C. A practically stationary (not vibrating) element in the system must be provided, to enable its fixation to the surrounding structure, in order to suspend the system without its imparting substantial vibrations to the vicinity.
D. Easy connecting mode of various driven members to the system.

To properly assess the system as to where it may and should be used, some practical applications may be stated:

A LINEAR PISTON COMPRESSOR

Relatively small piston diameters and high strokes should be devised. The moving-coil-electric-driver, may be employed, though being relatively expensive and having some wasted scattering magnetic flux.

The compressed gases, however, restrain the piston acting upon it like additional springs with higher rates at elevated compression outputs. That is what the above requirement B stands for, i.e., not permitting encountered stroke reductions which increase the dead compression volume rendering the pump ineffective. Also, frequently, such (smaller) compressors are hand held, e.g., for cryogenically cooled night-vision-laser-telescopes.

These fit the requirements of C.

Vibrating trays are widely used in material handling equipment. Such trays convey, serve or feed. Mostly those trays have the magnets armature fixed to them with special enforcing ribs and spring fixations to effect the required vibrating armature resilience. The new system meets requirement D enabling the tray to be simply fixed to or leaning against an output spring which transfers the vibration to the tray (as will become clear later on), especially in case the amplitude of a feeder tray should control the feeding rate which must remain unaffected by varying head loads. This is efficiently met by fulfilling requirement B.

SUMMARY OF THE INVENTION

A substantial advantage of the system resides in the possibility of employing a simple flat face armature, and inexpensive electromagnets, which are in high volume production, as electrical transformers.

DETAILED DESCRIPTION OF THE PREFERRED EMBODIMENT

Figure 1:
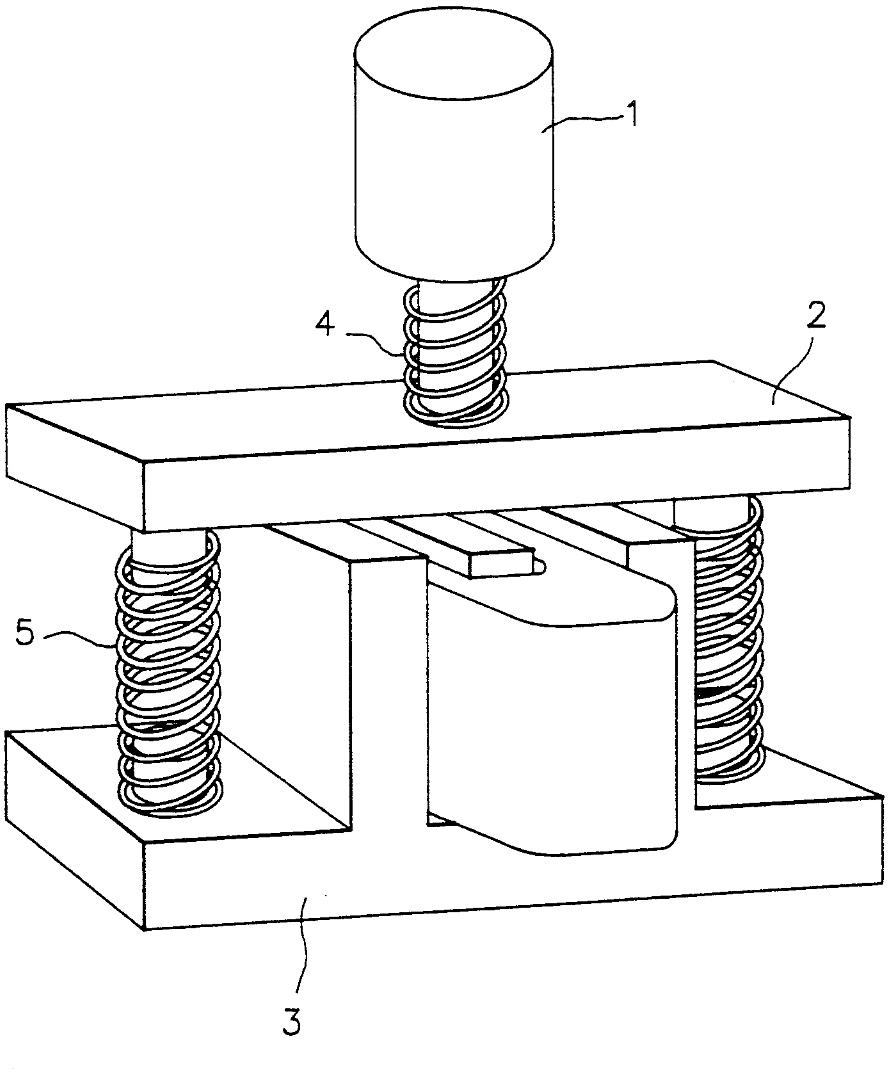
FIG. 1 illustrates the system of the present invention

The system principally comprises three masses according to FIG. 1. The first being marked 1 the driven mass. The second marked 2 being one of the two electromagnet's members, say the armature, and the third marked 3 being the electromagnet (including the coil).

The driven mass 1 is merely connected to a spring 4 and between armature 2 and magnet 3 there is a second spring 5.

In order to meet the above further three requirements the springs must be devised to fulfill the following equations:

The rate of spring 4 must comply with $$K_4 = M_1(2\pi f)^2 \quad (a)$$

and the rate of spring 5 should be $$k_5 = M_3\left[(2\pi f)^2 + \frac{F/\alpha_1}{M_1}\right] \quad (b)$$

where f is the electromagnet's vibrating frequency $F/\alpha_1$ is the required (or available) magnetic force amplitude per unit stroke amplitude of the driven mass 1.

M is the respective mass.

Since the amplitude $\alpha_1$ should be unaffected by the magnitude of $M_1$, a nominal mostly expected weight is selected and values for the whole system are calculated using this nominal $M_1$.

Further we must fulfill, with an obligatory $M_2$ the equation $$M_3 = M_1 \frac{M_2(2\pi f)^2 + F/\alpha_1}{M_1(2\pi f)^2 + F/\alpha_1} \quad (c)$$

which will make mass 2 not move as long as mass 1 does not deviate substantially from $M_1$.

On the other hand one gets between conditions and an under these conditions an amplitude $\alpha_3$ of mass 3 by using the equation:

$$\alpha_3 = \alpha_1 \frac{M_1}{M_3} \quad (d)$$

The vibrating amplitude of mass w is calculated using the equation $$\alpha_2 = \alpha_1 \frac{\Delta M}{M_1} \quad (e)$$

implying that as long as the relative deviation $\Delta M$ from $M_1$, $\Delta M/M_1$ is small, no significant $\alpha_2$ is being detected.

MORE HOLDING SPRINGS

Figure 2:
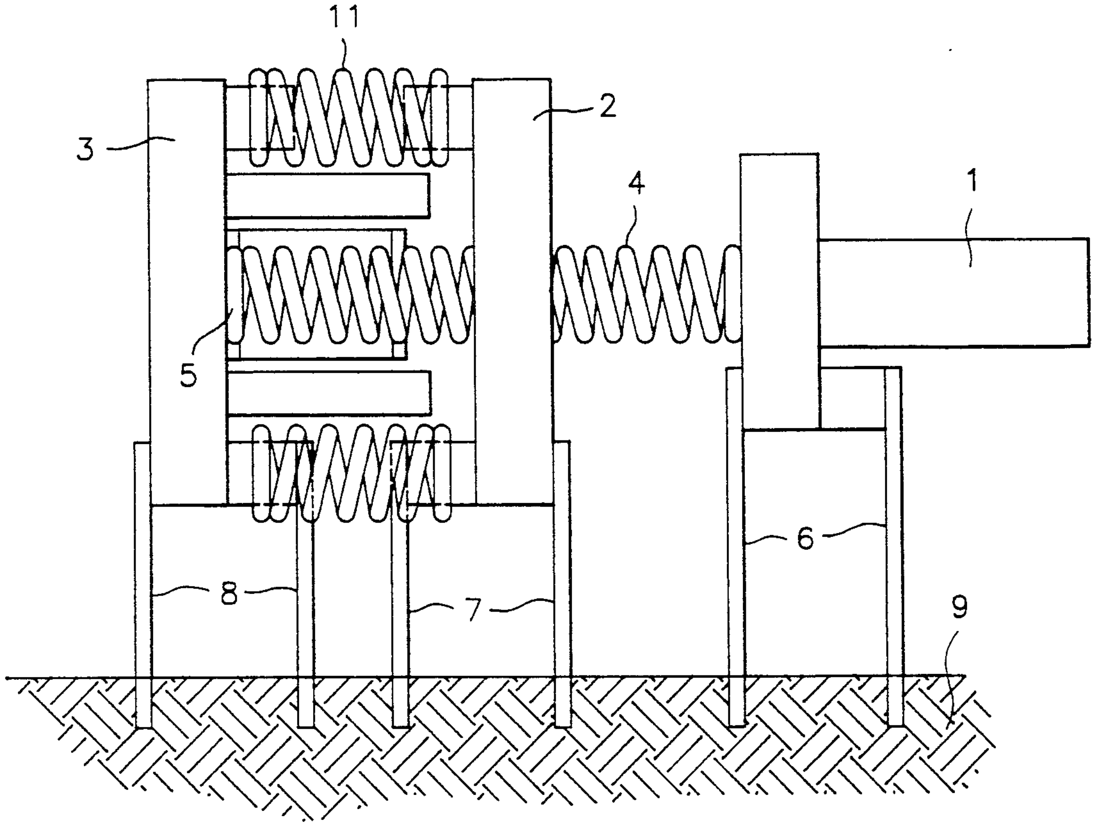
FIG. 2 illustrates the system of the present invention in which more springs are added

If further springs 6, 7 and 8 are attached as shown in FIG. 2, one should substitute unto the above equations (a), (b), (c), (d) and (e) for $$M_1 \rightarrow [M_1 - k_6/(2\pi f))^2] \quad (f1)$$

$$M_2 \rightarrow [M_2 - k_7/(2\pi f)^2] \quad (f2)$$

and for $$M_3 \rightarrow [M_3 - k_8/(2\pi f)^2] \quad (f3)$$

e.g. to the right hand side of equation (c) one must add $K_8/(2\pi f)^2$ in order to obtain the actually required mass of 3, wherein the equation will now read:

$$M_3 = [M - k_6/(2\pi f)^2]\frac{M_2(2\pi f)^2 - k_7 + F/\alpha_1}{M_1(2\pi f)^2 - k_6 + F/\alpha_1} + k_8/(2\pi f)^2 \quad (C1)$$

Such springs may be useful for easily operations with heavier masses.

In order to avoid transmittance of vibrations to the encircling structure 9 (to which the additional springs are attached), one should however maintain the relation between the respective spring rates, namely $$\frac{k_8}{k_6} = \frac{M_3}{M_1} \quad (g)$$

with $M_3$ and $M_1$ as their actual masses or their corrected ones by (f1) and (f3) respectively — in this case resulting in the identical ratio.

If however these springs 6, 7 and 8 are very soft, their influence in equation (f) may be neglected.

DEVIATIONS FROM THE THEORETICAL $M_3$ OF EQUATION (c)

In this chapter stress is laid on the quite complicated instruction of how to introduce minor modifications in the mass of member 3.

If $M_3$ is designed a little larger than equation (c) dictates, then an increasing $M_1$ will cause an elevated $\alpha_1$, which should be welcome e.g. whenever the tray 1 becomes overloaded, the increase in the size of $M_3$ permits enhanced material removal.

Sometimes this slightly increased theoretical $M_3$ does not materialize due to the excessive tray load causing considerably more friction—reducing the actual amplitude $\alpha_1$. In other words, even if a steady $\alpha_1$ under all conditions is necessary, it still is advisable to select a somewhat higher $M_3$ to encounter friction losses from tray overloads.

In compressors, on the other hand, an overload becomes remarkable by an encountering piston pressure, as a piston pressure becomes equivalent to a spring which rate is linearly pressure proportional. This pressure rise will be regarded as an additional spring 6 reducing the effective mass $M_1$ as viewed in eq. (f1). The varying M1 will not of course affect $\alpha_1$ but together with the elevated pressure, also further output power would be required, will cause an amplitude reduction. In order to overcome this phenomenon, it is suggested to make $M_3$ somewhat (experimentally deduced) smaller than the value found from equation (c), causing an $\alpha_1$ increase due to the piston pressure rise. But that enlarged $\alpha_1$ is not realized, due to the accompanying increasing output power. The required energy is extracted by a proportionally enlarged vibrating gap between magnet and armature (parts 2 and 3).

"HI-AM" BUMPER SPRINGS, FOR BETTER ELECTROMAGNET UTILIZATION

Figure 3:
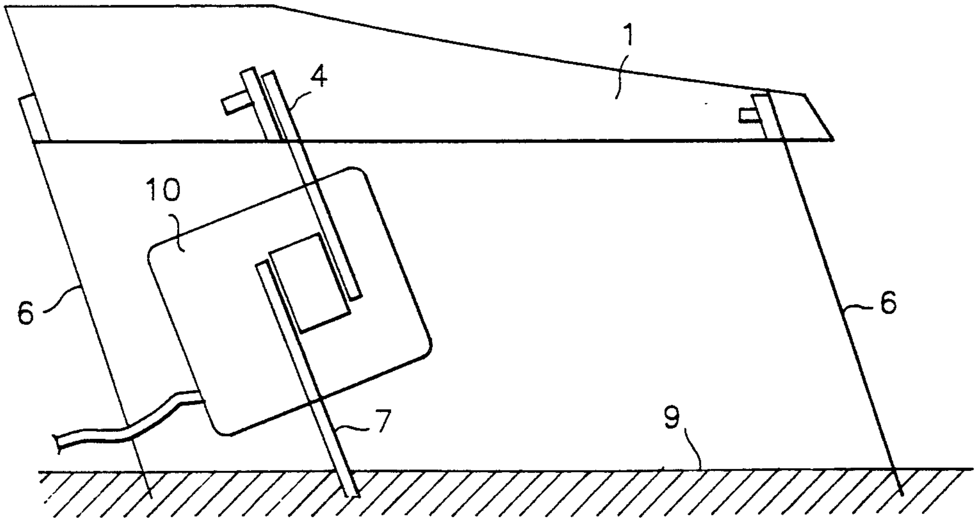
FIG. 3 illustrates the system of the present invention in which bumper springs have been introduced.

FIG. 3 introduces additional bumper springs 11 to the system. These known spring arrangements prevent the armature from hitting against the electromagnet, and serve to effectively increase the amplitude of the driven mass.

ENCLOSURE

FIG. 3 exhibits another use of the system 10, as applied in a material handling trough. Specifications C and D are utilized for totally enclosing the system by a cover, fixed to part 2, which scarcely moves. That cover is flexibly held by 7 and connected to the trough via 4.

This totally enclosing feature and the simple connection between the stationary cover, by spring 4 to the trough, result in an extremely practical vibrating motor for many industrial and laboratory applications, exhibiting a system which is non sensitive to the vicinity and which may also be considered explosion proof.

I claim:

1. A vibration system comprising:

a first driven mass;

a second mass representing a first electromagnetic member, and a third mass representing a second magnetic member, wherein a vibrating gap attracts the second mass to the third mass in an oscillating manner through electrical current fluctuations, and the system further comprises a first spring being connected between the first and the second mass; and a second spring connected between the second and the third mass, the magnitude of the mean first mass and second mass determining the construction of the third mass by the equation $$M_3 = \frac{M_2(2\pi f)_2 + F/\alpha_1}{M_1(2\pi f)^2 + F/\alpha_1}\text{; wherein}$$

$M_3$ is the third mass, $M_1$ is the second mass, f is the vibrating frequency of the electromagnet, and $F/\alpha_1$ is the required magnetic force amplitude per unit stroke amplitude of the driven mass, together with slight deviations, from that magnitude according to the application of the system, and the two springs being constructed according to the equations $$K_1 = M_1(2\pi f)^2\text{, and}$$

$$K_2 = M_3(2\pi f)^2 + \frac{F/\alpha}{M_1}$$

wherein $K_1$ is the rate of spring 1 and $K_2$ is the rate of spring 2, respectively.

2. A vibrating system according to claim 1 further comprising additional holding springs connected between the three masses with a stationary fixed frame and wherein the springs modify the constructional requirements according to the equation $$M_n \rightarrow [M_n - K_1/(2\pi f)^2]$$

and while the magnitude of the spring to the second mass is freely selectable, the ration between the rate of the spring to the first mass and the rate of the spring to the third mass is the same as the ratio between the respective masses, $$\frac{K_5}{K_3} = \frac{M_3}{M_1}.$$

3. A vibrating system according to claim 2 wherein the additional holding springs are soft enough that no correction factor is imparted according to the equations $$M_1 \rightarrow [M_1 - K_3/(2\pi f)^2]$$

$$M_2 \rightarrow [M_2 - K_4/(2\pi f)^2]$$

$$M_3 \rightarrow [M_3 \rightarrow K_5/(2\pi f)^2]$$

4. A vibrating system according to claim 1 wherein additional springs are attached between the second mass and third mass and having a free gap between the additional springs and one of the second and third masses in a rest position of the system.

5. A system according to claim 1 wherein closure seals the second and third masses with a magnet coil and the second spring between second and third masses.

6. A system according to claim 1 where the first "driven mass" is a sifting or conveying trough.

7. A system according to claim 1 where the first "driven mass" is a pumping piston.

* * * * *